United States Patent [19]
Koshi

[11] Patent Number: 5,491,824
[45] Date of Patent: Feb. 13, 1996

[54] SYSTEM AND METHOD FOR IMPROVED EFFICIENCY AND DEADLOCK PREVENTION IN COMMUNICATION INTERFACES UTILIZING A FIRST-IN-FIRST-OUT ACTION QUEUE

[75] Inventor: Enathickal J. Koshi, Tucson, Ariz.

[73] Assignee: International Business Machines Corporation, Armonk, N.Y.

[21] Appl. No.: 363,567

[22] Filed: Dec. 22, 1994

Related U.S. Application Data

[63] Continuation of Ser. No. 871,865, Apr. 20, 1992, abandoned.

[51] Int. Cl.$^6$ .................................................. G06F 13/14
[52] U.S. Cl. ..................... 395/732; 395/728; 395/729; 395/200.03; 395/200.06; 395/650; 395/860; 395/859; 364/DIG. 1; 364/242.6; 364/242.8; 364/248.2
[58] Field of Search ................................. 395/728, 729, 395/732, 200.03, 200.06, 800

[56] References Cited

U.S. PATENT DOCUMENTS

| | | | |
|---|---|---|---|
| 3,638,198 | 1/1972 | Balogh, Jr. ............................. | 395/800 |
| 3,735,357 | 5/1973 | Maholick et al. ...................... | 395/325 |
| 4,281,381 | 7/1981 | Ahuja et al. ............................ | 395/325 |
| 5,155,854 | 10/1992 | Flynn et al. ............................ | 395/725 |
| 5,239,650 | 8/1993 | Hartung et al. ........................ | 395/650 |
| 5,265,257 | 11/1993 | Sincoe et al. .......................... | 395/725 |

FOREIGN PATENT DOCUMENTS 0371610  10/1989  European Pat. Off. .

OTHER PUBLICATIONS

Deitel; *An Introduction to Operating Systems* 1984; pp. 254–255.
Database WPI, Week 8946, Derwent Publications Ltd., London, GB; AN 89–338303 & SU–A–1 479 930 (POPOV) 15 May 1989 Abstract.
Database WPI, Week 8723, Derwent Publications Ltd., London, GB; AN 87–162326 & SU–A–1 265 772 (Sharpilo) 23 Oct. 1986 Abstract.
Patent Abstracts Of Japan vol. 15, No. 335 (P–1242) 26 Aug. 1991 & JP–A–31 23 953 (Toshiba) 27 May 1991 Abstract.

*Primary Examiner*—Alyssa H. Bowler
*Assistant Examiner*—L. Donaghue
*Attorney, Agent, or Firm*—Manny W. Schecter; Andrew J. Dillon

[57] ABSTRACT

A system for and method of operating of data communication interface for handling communication between a data processing system and a plurality of communication channels is disclosed. The method provides for monitoring posting of actions from the data processing system and from the plurality of communication channels. Responsive to detection of posting of an action, it is determined if the action was posted by the data processing system. Where the action was posted from the data processing system, it is determined if conditions permit the action to be executed. Responsive to an affirmative determination that the action can be executed it is executed. Responsive to a determination that the action was posted from the host data processing, but was not executable, the action is added to the end of a queue of actions. The first entry in the queue is then examined for executability. If executable, the first action is executed and replaced as first action with the next action from the queue, if any. If the first action cannot be executed, it is moved to the end of the queue and replaced the first action with a next action from the queue, if any. Actions required for response to interrupts from communication controllers are end queued upon receipt.

7 Claims, 5 Drawing Sheets

SYSTEM AND METHOD FOR IMPROVED EFFICIENCY AND DEADLOCK PREVENTION IN COMMUNICATION INTERFACES UTILIZING A FIRST-IN-FIRST-OUT ACTION QUEUE

This is a continuation, of application Ser. No. 07/871,865, filed Apr. 20, 1992 now abandoned.

BACKGROUND OF THE INVENTION

1. Technical Field:

The invention relates to data communication interfaces between data processing systems across one or more communication channels. More particularly, the invention relates to scheduling actions relating to receipt and transmission of data packets between a data processing system across a plurality of communication channels. Still more particularly, the invention relates to providing efficient operation of communications related actions in the data communication interface while avoiding occurrence of a deadlock situation.

2. Description of the Related Art:

Microprocessor based data communication interfaces for control of communication between a host computer and several input/output devices or communication channels, handle incoming data packets over the channels, outgoing packets or messages from one or more host computer applications and communication between the interface and the host, typically through a shared memory, or a shared area of system memory. Data transmission over the communications channels is usually asynchronous, in other words messages may be incoming on all channels simultaneously, without regard to activity on the parallel channels.

In addition to handling several simultaneously active communications channels, operating at high data rates, the data communication interface has a number of duties attendant to handling communications including aiding synchronization of messages with the operation of the computer, passing status messages and performing error detection operations. Among the various tasks performed by the data communication interface are those such as acknowledgements for incoming data packets which must be performed within data communication protocol specified time out periods or which must be forwarded to a host data processing system within a maximum period for some host purpose. Immediate responsiveness to a host request, such as the handling of an outgoing message may also be desirable.

The various tasks put upon the interface processor can obviously lead to demands which conflict. This can result in the failure to handle actions in their respective required periods, leading in turn to repetition in requests or redispatch of data packets. Delay in itself leads to an increase in traffic on communication channels adding to the problem and giving rise to the potential of deadlock in the interface.

The sequence in which a data communication interface handles tasks thus has a direct impact on efficiency of the interface. An inefficient sequence can generate a deadlock at times of peak loads or when high error rates are encountered. Resort to more powerful and faster processors for the interface, without improved control of the sequencing of operations, will increase cost of the device and may prove disappointing in service. cl SUMMARY OF THE INVENTION It is therefore one object of the invention to provide an improved data communication interface between a data processing system and one or more communication channels.

It is another object of the invention to provide a system and method for scheduling actions relating to receipt and transmission of data packets between a data processing system and a plurality of communication channels.

It is yet another object of the invention to provide a system and method for efficient dispatch of communications related actions in the data communication interface while avoiding occurrence of deadlock.

The foregoing objects are achieved as is now described. A system for and method of operating a data communication interface for handling communications between a data processing system and a plurality of communication channels is provided. The method provides for monitoring posting of tasks from the data processing system and from the plurality of communication channels. Responsive to detection of posting of a task, it is determined if the task was posted by the host data processing system. Where the task was posted from the host data processing system, it is determined if conditions permit the action to be executed at once. Responsive to an affirmative determination the action is executed. Responsive to a determination that the task was posted from the host data processing, but was not executable, the action is added to the end of a queue of actions for execution by the data communication interface. Then the first entry in the queue is examined for executability. If executable, the first action is executed and replaced as first action with the next action from the queue, if any. If the first action cannot be executed, it is moved to the end of the queue and replaced as the first action with a next action from the queue, if any. Interrupt handlers for each of several communication channels add actions to the end of the queue as required.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
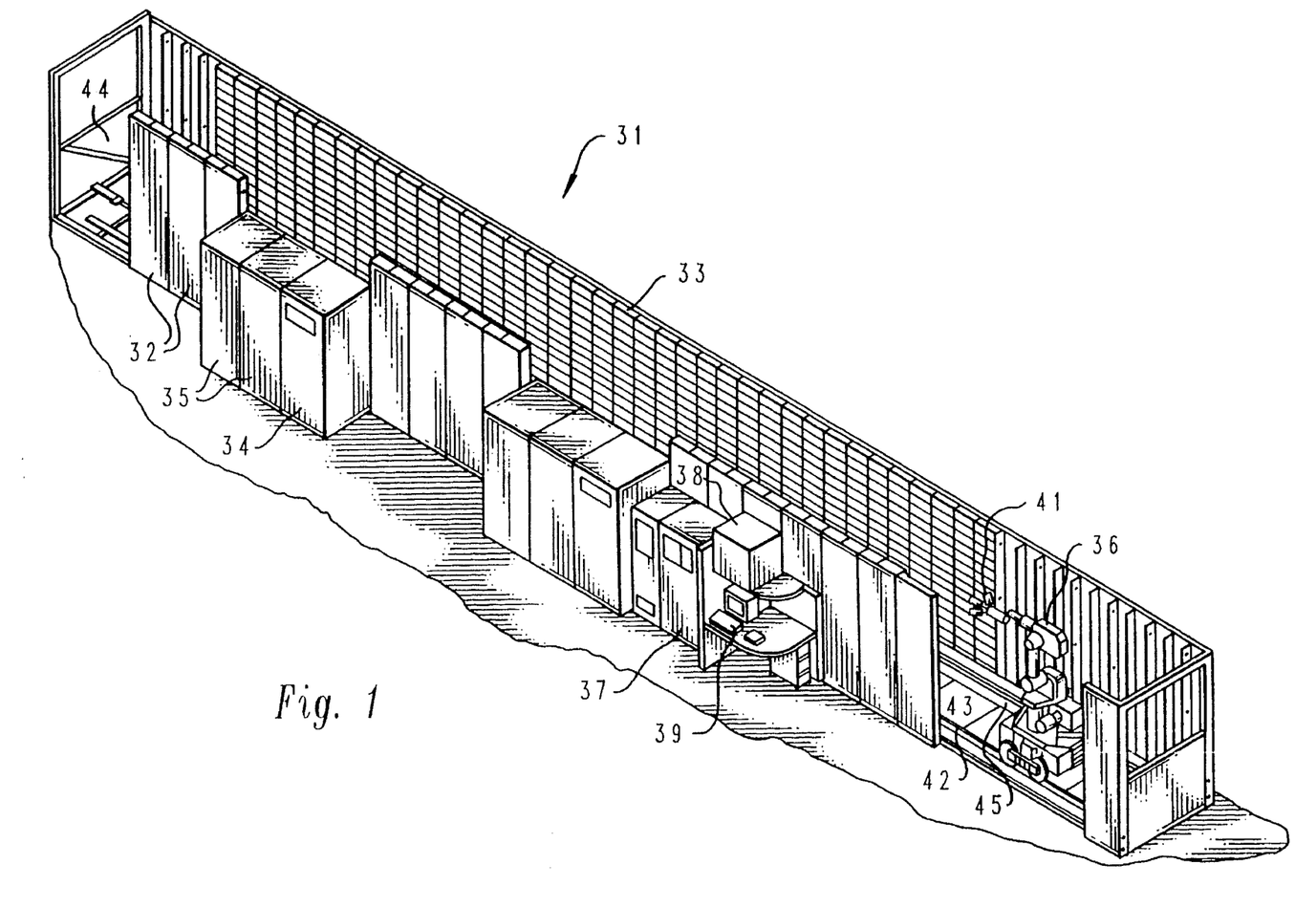
FIG. 1 is a pictorial diagram of an automated storage library having an anthropomorphic robotic picker.

With reference now to the figures and in particular with reference to FIG. 1, is depicted an automated cartridge library 31 for managing a large database, wherein data is stored on magnetic tapes. Each magnetic tape is housed in a plastic cartridge for protecting the magnetic tape and providing a convenient handling mechanism for a robotic picker. The automatic cartridge library 31 includes a plurality of modules 32, wherein each module is made from a plurality of magazine holders 33. Each magazine holder consists of a plurality of storage slots, and each storage slot is capable of storing a magnetic tape cartridge therein. The automatic cartridge library 31 also includes at least one tape unit, for example, an IBM 3490 or IBM 3490E Magnetic Tape Subsystem having a controller 34 and tape drives 35. A robot 36, having a gripper/vision assembly 41 attached thereto, travels on an outrigger rail 42 and a guide rail 45 to transfer tape cartridges between the storage slots 33 and the tape drives 35. The robot 36 is anthropomorphic in that it is capable of human-like motions. A suitable anthropomorphic robot 36 is Model GMF S-10 robot, manufactured by Fanuc, Ltd. Robot 36 is depicted with one gripper/vision assembly 41, but may be provided with two or more such assemblies allowing robot 36 to perform two or more operations at a single location, such as a demount and a mount of tape cartridges from a tape drive 35.

A robot controller 37, attached to the automatic cartridge library 31, commands the robot 36. A service bay 43 for the robot 36, is located at one end of the automated cartridge library 31. The service bay 43 functions as a parking space for the robot 36 when it is not in use or when it is being serviced. An operator access bay 44 is provided at the other end of the automatic cartridge library 31 allowing service personnel to enter. A remote terminal bay 38, accessible internally by the service personnel, is attached to the automated cartridge library 31. A library manager 39 is connected to library 31, to control robot 36 and tape drive controller 34. The communications operations provided by the present invention reside within library manager 39. Library manager 39 is provided by an IBM PS/2 personal computer.

The automated cartridge library 31 is expandable for storing additional tape cartridges or improving access time. Additional modules 32 can be added for increasing storage capacity. Additional outrigger rail 42 and guide rail 45 must then be added to allow the robot 36 to travel the additional distance. Also, the operator access bay 44 may be replaced by a second service bay 43 adding a second robot. An input/output port is also available (not shown) to allow an operator to add or remove tape cartridges to and from the automated cartridge library 31. Once a set of tape cartridges have been inserted into the input port, the robot 36 can be instructed to identify the tape cartridges and move them accordingly. Similarly, an operator is prompted to remove tape cartridges previously inserted into the output port by the robot 36.

Figure 2:
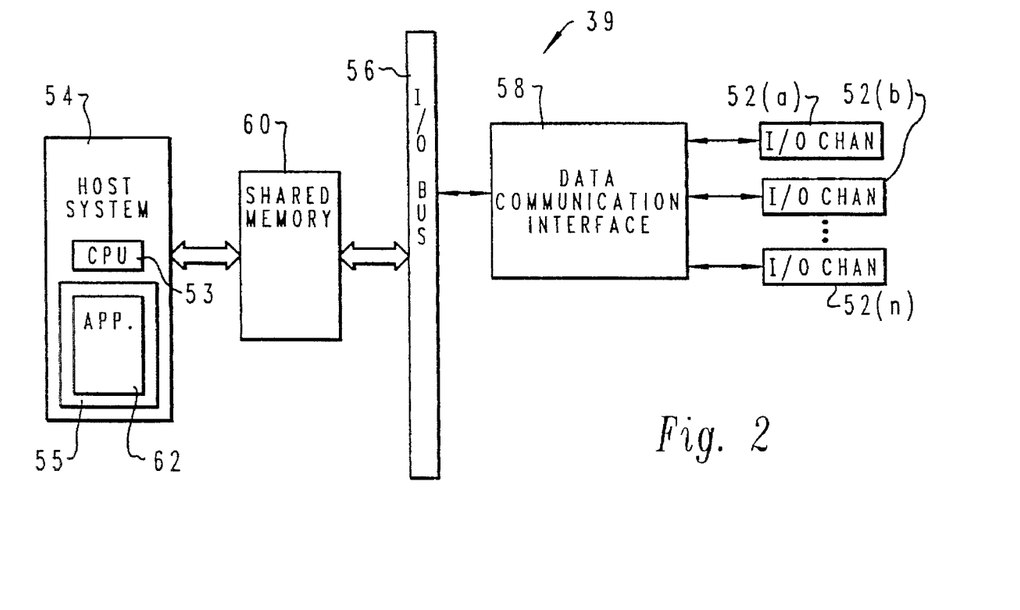
FIG. 2 is a high level block diagram of a data processing system with which the system and method of the present invention may be practiced.

FIG. 2 illustrates a data processing system 39 such as may communicate with one or more tape drives as provided by tape library 31, or with disk drives, modems, or other peripheral devices over a plurality of RS-232 serial data ports connected to one or more input/output communication channels 52(a) through 52(n). Data processing system 39 is preferably provided by an IBM PS/2 personal computer, which is characterized by a separate system bus to which the central processing unit 53 (provided by an Intel 80386 or Intel 80486 microprocessor) and system memory 55 are connected (all as part of host system 54) and an input/output bus 56 which is generally connected to a video display system, printers, and here a data communication interface 58. Data is exchanged between data communication interface 58 and host system 54 via a shared memory 60 which is connected to both busses. Data communication interface 58 is directly connected to each of the plurality of communication channels 52(a) through 52(n) and input/output bus 56 and controls actual receipt of data packets from the channels as well as transmission onto the channels. At least one application program 62, utilizing data communication interface 58 for exchange of data with external devices, is resident in memory 55.

Figure 3:
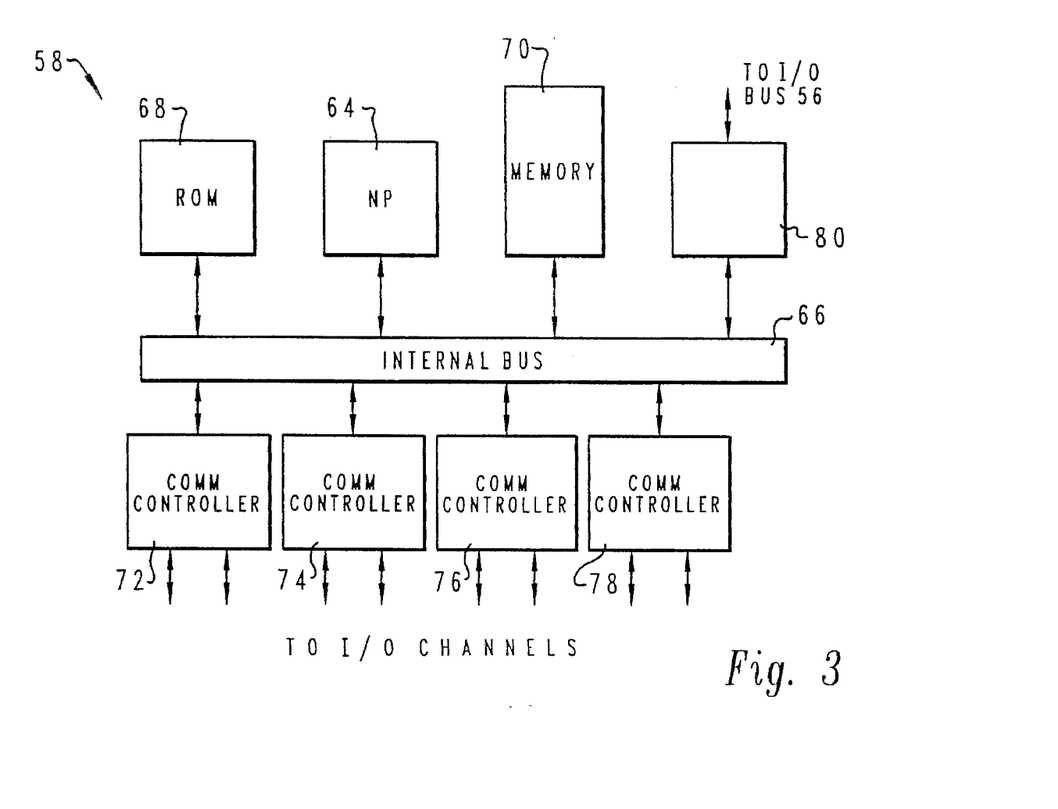
FIG. 3 is a block diagram of a data communication interface with which the system and method of the present invention may be utilized.

FIG. 3 is a block diagram illustration of data communication interface 58. Interface 58 has its own microprocessor 64, preferably provided by an Intel 80186 microprocessor. Microprocessor 64 is connected for communication with the other components of data communication interface 58 over an internal bus 66. Also connected to internal bus 66 are read only memory (ROM) 68, which includes microcode utilized to initialize interface 58 upon power up of system 50. Memory 70 is connected to bus 66 to provide storage, during execution, of a process through which the method and system of the present invention are implemented, as well as to support data structures utilized in execution of the process. Memory 70 in a preferred embodiment has 512 Kbytes of data storage capacity. Upon power up of system 50 host 54 loads a program into memory 70 to initiate the process.

Data communication interface 58 includes four communication controllers 72, 74, 76 and 78 connected to internal bus 66. Each controller 72–78 has two RS-232 or RS-422 ports allowing communication over two channels through each controller. Controllers 72–78 may be provided by Zilog 8030 communication controllers. Lastly, a shared storage interface controller 80 is connected between internal bus 66 and input/output bus 56 for controlling access by microprocessor 64 to the input/output bus 56 and shared memory 60. Controller 80 passes interrupts from the host to the interface 58 and back and controls access to shared memory 60 by interface 58.

Figure 4:
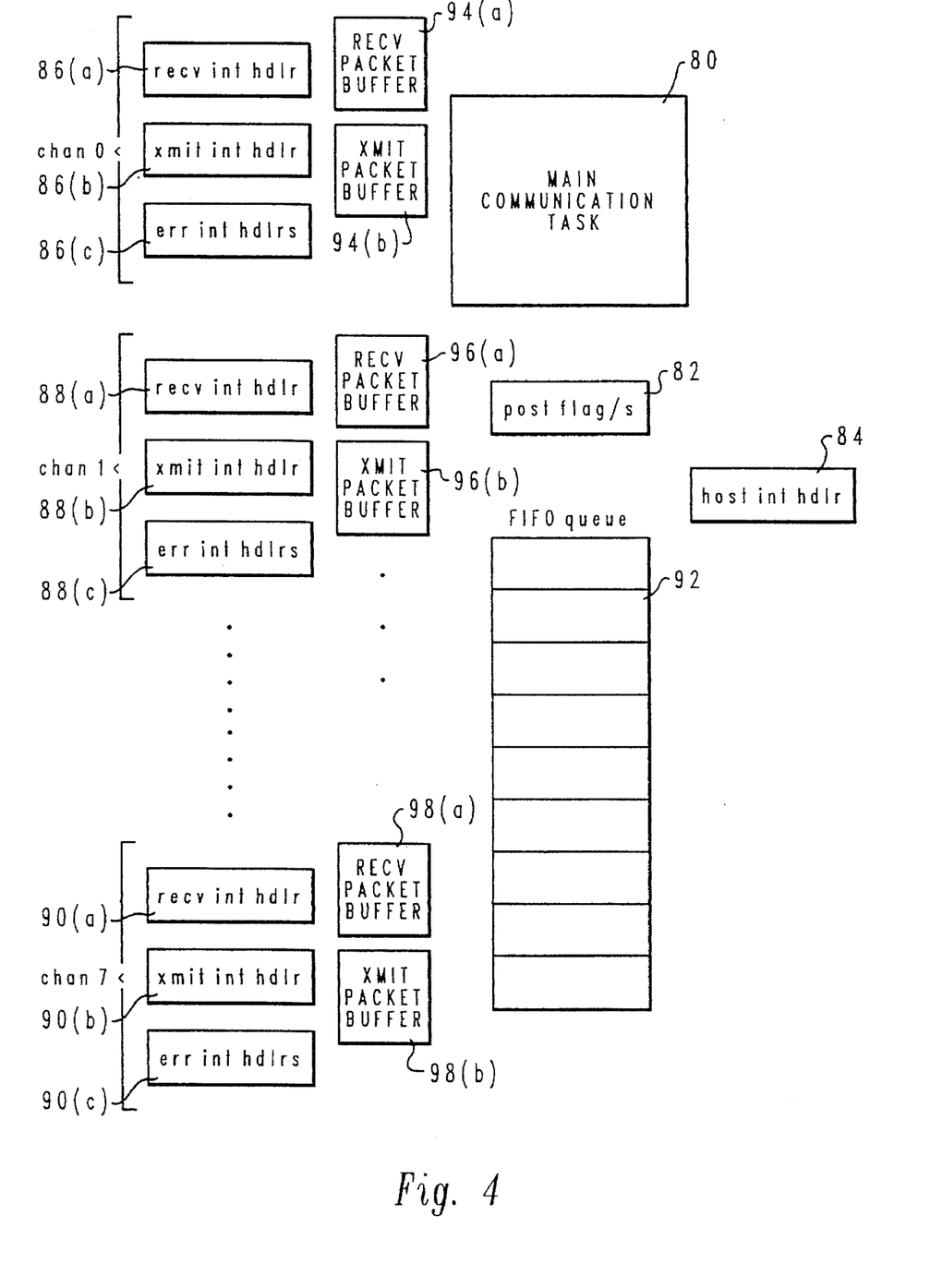
FIG. 4 is an illustration of a data structure for organizing a program implementation of the system and method of the present invention.

FIG. 4 is a block diagram illustration of the program modules and data structures present in memory 70 supporting implementation of the system and method of the present invention. A main communication task 80 includes the instructions for the method implementing the invention on a data processing system. Main communication task 80 periodically examines entries in a flag posting block 82, where flags are set in response to external events. Flags require the attention of processor 64 for the initiation of selected operations.

External events, such as a request by the host system or the arrival of a data packet or message over a communication channel, are registered by each of several interrupt handlers which respond to signals over internal bus 66 from one of communication controllers 72–78, and from access controller 80. A receive interrupt handler, a transmit interrupt handler and error interrupt handlers are provided each channel controlled by the interface. A receive interrupt handler responds to receipt by a communication controller of a data packet over a communication channel. Transmit interrupt handler responds to indication that a communication controller is ready to transmit. Error interrupt handler is utilized to identify error conditions on a communications channel or its associated communication controller.

In the preferred embodiment, eight channels are controlled by each interface card and accordingly eight sets of interrupt handlers, with associated receive and transmit packet buffers are provided. Associated with channel 0, and thereby handling interrupt signals generated by the communication controller for channel 0, are a receive interrupt handler 86(a), a transmit interrupt handler 86(b), and error interrupt handlers 86(c). Associated with channel 1 are receive interrupt handler 88(a), a transmit interrupt handler 88(b), and error interrupt handlers 88(c). Associated with channel 7 are receive interrupt handler 90(a), a transmit interrupt handler 90(b), and error interrupt handlers 90(c). Associated with the host processing system is a host interrupt handler 84 which responds to interrupt signals provided via access controller 80.

The function of the interrupt handlers is to post flags in data block 82 for detection by main communication task 80. In addition, receive interrupt handlers, transmit interrupt handlers and error interrupt handlers make entries for required actions into First-In-First-Out (FIFO) queue 92, execution of which occurs in order of presentation (if executable) from the queue under the control of main communication task 80. Actions identified by host interrupt handler 84 are recovered from shared memory 60 upon detection by main communication task 80 and executed immediately upon detection, if executable. Thus data communication interface 58 operates on host requests immediately if executable and queues tasks from communication channels.

Each receive interrupt handler and transmit interrupt handler has an associated reserved area of memory providing buffer space for data packets. For example, receive interrupt handler 86(a) has an associated receive packet buffer 94(a) for storing data packets just received over communication channel 0 until main communication task 80 can handle forwarding of the appropriate portion of the data packet to the host. Transmit interrupt handler 86(b) has a transmit packet buffer 94(b) for storing outbound data packets from the host. Receive packet buffers 96(a) and 98(a) are associated with receive interrupt handlers 88(a) and 90(a) respectively. Transmit packet buffers 96(b) and 98(b) are associated with transmit interrupt handlers 88(b) and 90(b) respectively.

Interrupt handlers are executed upon interruption of execution of main communication task 80. Additional modules will be present in memory 70 for the processing of specific commands or actions relating to communication, however, those actions relate to the present invention only in so far as they may or may not be executable when called, based upon status of various system components. Such status indications would include availability of shared memory 60, or the presence of traffic on one or another of the communication channels. For example, an action requiring transmission of data over a channel may not be possible while data is currently being transmitted over the same channel.

Figure 5:
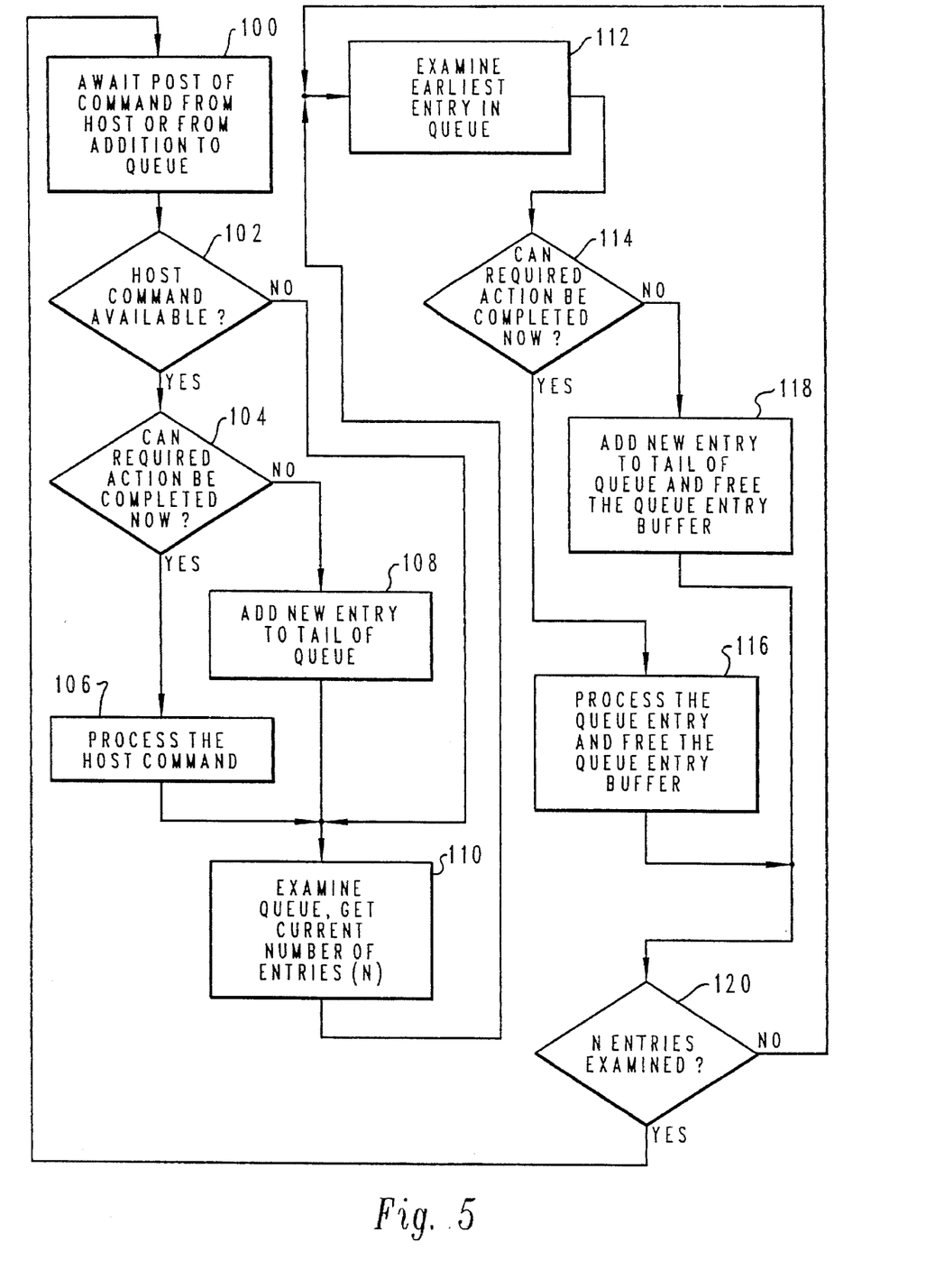
FIG. 5 is a high level logical flow chart of a program implementation of the system and method of the invention.

FIG. 5 is a flow chart illustrating the process of main communication task 80. The process is entered after power up and loading of the process from the host. With execution of step 100, post flag block 82 is examined to determine the presence of any set flags indicating a request for execution of host or communication related action. Next, step 102 is executed to determine if the flag was posted by an application running on the host, i.e. a host request. As noted above, in the preferred embodiment host interrupt handler 84 does not queue requests from the host. If a host command is available, the YES branch is followed to step 104, which is executed to determine if the required action can be executed. If the action can be executed, the appropriate routine for processing of the action is called with execution of step 106. If a action is determined to not be executable at step 104, the NO path is taken to step 108, which enters the host command into the bottom of queue 92.

Step 110 is reached upon completion of steps 106 or 108, or along the NO branch from step 102. Step 110 is utilized to initiate a DO-loop through all actions entered in queue 92. At step 112, the first entry in queue 92 is recovered. At step 114 it is determined if the action indicated by the entry can be done. If the action cannot be done, step 118 is executed to return the action to the bottom the queue as a new entry, frees the original queue entry buffer associated with that action, and posts a flag in block 82 for detection by the main task after return to step 100. The flag indicates the presence in the queue of a task. If the action can be executed, the YES branch is followed from step 114 to step 116, which is utilized to direct execute the action and to promote the next queue entry. From both steps 116 and 118, step 120 is executed to determine if a number of actions corresponding to the number of entries in queue 92 detected at step 110 have been evaluated, whether they were executed or not. If not the process loops back to step 112. If all entries have been examined once, the process is returned to step 100. Because the process of main communication task 80 may be interrupted, new actions may have been posted during execution of the process, either from the host interrupt handler or from one of the channel related interrupt handlers.

Figure 6:
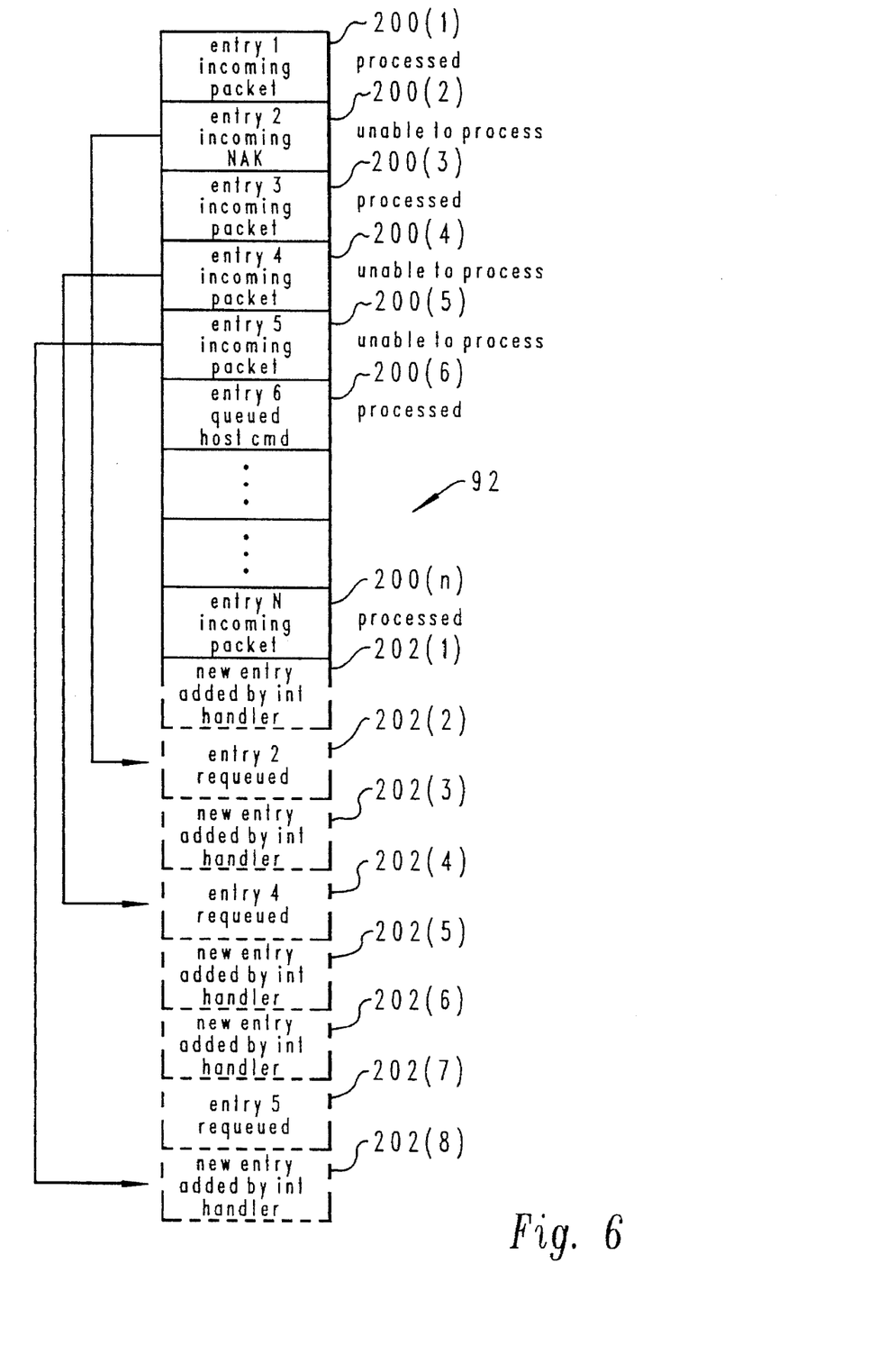
FIG. 6 is a diagrammatic illustration of an example status of actions within a queue in accordance with operation of the system and method of the present invention.

FIG. 6 illustrates the updating of queue 92 which occurs during processing of main communication task 80 and due to parallel execution of one of several interrupt handlers. Entries 200(1) through 200(N) represent the state of the queue upon initiation of a loop at step 110 in FIG. 5. Entry 200(1) is indicated as processed. During its execution, an interrupt handler adds entry 202(1) to the queue. Entry 200(2) cannot be processed and is requeued behind entry 202(1) as entry 202(2). Similar steps are taken with each queued entry in sequence, with executable actions being executed, and non-executable steps being requeued to the bottom of the queue as it exists upon the determination being made.

When several communication channels are to be served by an interface based upon a single processor, a primary goal is to avoid loss of incoming data packets received on the channels. The invention achieves this by serialization of the packets, generation of low level acknowledgements for each packet with minimum delay and the efficient transfer of the appropriate portions of the packet to the host. Outgoing packets are formatted and transmitted with the least amount of delay, as are other host system requests, in concordance with serial treatment of the requests.

Serialization is achieved by the use of a queue, whose entries are filled by the transmit, receive and error interrupt handlers which service the communication controller devices' interrupts. Entries in the queue may also be made by the communication processor's main task itself, for actions it is unable to complete immediately.

A typical communication processor will be able to execute one or more tasks under the control of a real-time executive. This task will usually be posted by interrupt handlers when incoming packets and acknowledgements are received. Each time a new entry is added to the queue, the task must be posted, so that it can be scheduled to process that entry. On the other hand, host commands for transmission of packets and other actions to be taken will typically be conveyed across the host interface to the communication processor by an interrupt mechanism, along with data in a shared memory window, or in common memory accessed by a bus arbitration process following the interrupt. The interrupt will usually be serviced by the executive, and will result in the communication task being posted to process that command.

The system and method of the present invention provides the earliest useful retry on any required action that cannot be completed on initial presentation. The sequence established by the method provides that feature utilizing queueing as a technique. By evaluating the full queue just once each repetition (i.e. by stopping after N entries) it is ensured that: (1) any new host command that arrived after processing of the queue is started is evaluated for processing with the minimum delay; (2) any requeued entry is not retried immediately, thus avoiding useless retries until all other actions have been tried; and (3) any new entries from interrupt handlers are not given precedence over pending host commands or previously requeued entries.

While the invention has been particularly shown and described with reference to a preferred embodiment, it will be understood by those skilled in the art that various changes in form and detail may be made therein without departing from the spirit and scope of the invention. The described algorithm may be used as a general solution to the problems of efficiency and deadlock prevention in data communication interfaces.

What is claimed is:

1. A method of operating a data communication interface between a host data processing system and a plurality of data communication channels, the data communication interface having a processor and a plurality of communication controllers, each associated with one of the plurality of communication channels, the method comprising the steps executed by the data communication interface of:

posting actions in response to requests from the host data processing system and a plurality of communication controllers;

monitoring for posting of actions;

responsive to detection of posting of an action, determining if an action was posted in response to a request by the host data processing system;

determining if the action can be executed if the action was posted in response to a request by the host data processing system;

if the determination of the last step is affirmative, executing the action;

if the action was posted in response to a request by the host data processing but was not executable, or if the action was posted in response to a request by one of said plurality of communication controllers, adding the action to an input of a First-In-First-Out queue;

examining only a first action in said First-In-First-Out queue to determine if said first action can be executed;

if the first action can be executed, executing the first action and replacing it as first action with a next action from said First-In-First-Out queue, if any; and if the first action cannot be executed, moving the first action to said input of said First-In-First-Out queue and replacing it as first action with a next action from said First-In-First-Out queue, if any.

2. A method of operating a data communication interface between a host data processing system and a plurality of data communication channels, the data communication interface having a processor, and a plurality of communication controllers, each associated with one of the plurality of communication channels, as set forth in claim 1, and further comprising:

repeatedly executing the steps of the process beginning with the step of determining whether the first action can be executed until all actions in said First-In-First-Out queue have been evaluated.

3. A method of operating a data communication interface between a host data processing system and a plurality of data communication channels, the data communication interface having a processor, and a plurality of communication controllers, each associated with one of the plurality of communication channels, as set forth in claim 2, and further comprising:

when an action responsive to a request from a communication controller is posted to the data communication interface, adding the action to an input of said First-In-First-Out queue.

4. A data communication interface for handling communication between a data processing system and a plurality of communication channels, comprising:

means for posting actions in response to requests from the data processing system and from the plurality of communication channels;

means responsive to detection of posting of an action for determining if the action originated with the data processing system;

means responsive to an affirmative determination of posting of an action originating with the data processing system for determining if the action can be executed;

means responsive to an affirmative determination that the action can be executed for executing the action;

means responsive to a determination that the action originated with the host data processing system but was not executable, or a determination that the action was posted in response to a request by one of said plurality of communication controllers, for adding the action to an input of a First-In-First-Out queue;

means for examining only a first action in said First-In-First-Out queue to determine if said first action can be executed;

means responsive to determination that the first action can be executed for executing the first action and for replacing it as first action with a next action from said First-In-First-Out queue, if any; and means responsive to determination that the first action cannot be executed for moving the first action to said input of said First-In-First-Out queue and for replacing it as first action with a next action from said First-In-First-Out queue, if any.

5. A data communication interface for handling communication between a data processing system and a plurality of communication channels as set forth in claim 4, further comprising:

means for evaluating all actions in said First-In First-Out queue for execution.

6. A data communication interface for handling communication between a data processing system and a plurality of communication channels as set forth in claim 5, and further comprising:

means responsive to posting of an action originating with a communication controller for adding the action to an input of said First-In-First-Out queue.

7. An automated storage library for communicating with a plurality of communication channels, the automated storage library comprising:

a plurality of physical files;

a plurality of magazines for holding the physical files;

a drive unit for receiving physical files;

means for carrying physical files between the magazines and the drive unit;

a data processing system connected between the plurality of communication channels and the drive unit;

means for posting actions in response to requests from the data processing system and from the plurality of communication channels;

means responsive to detection of posting of an action for determining if the action originated with the data processing system;

means responsive to an affirmative determination of posting of an action originating with the data processing system for determining if the action can be executed;

means responsive to an affirmative determination that the action can be executed for executing the action;

means responsive to a determination that the action originated with the host data processing but was not executable or a determination that the action is posted in response to a request by one of said plurality of communication channels, for adding the action to an input of a First-In-First-Out queue;

means for examining only a first action in said First-In-First-Out queue to determine if said first action can be executed;

means responsive to determination that the first action can be executed for executing the first action and for replacing it as first action with a next action from said First-In-First-Out queue, if any; and means responsive to determination that the first action cannot be executed for moving the first action to said input of said First-In-First-Out queue and for replacing it as first action with a next action from said First-In-First-Out queue, if any.

* * * * *